(12) United States Patent
Di Giusto et al.

(10) Patent No.: US 10,330,228 B2
(45) Date of Patent: Jun. 25, 2019

(54) PIPE CONNECTION FITTING

(71) Applicant: Ingersoll-Rand Company, Davidson, NC (US)

(72) Inventors: Eros Di Giusto, Remanzacco (IT); Mauro Dell'Acqua, Carasco (IT)

(73) Assignee: Ingersoll-Rand Company, Davidson, NC (US)

( * ) Notice: Subject to any disclaimer, the term of this patent is extended or adjusted under 35 U.S.C. 154(b) by 185 days.

(21) Appl. No.: 15/250,534

(22) Filed: Aug. 29, 2016

(65) Prior Publication Data
US 2017/0059068 A1 Mar. 2, 2017

Related U.S. Application Data

(60) Provisional application No. 62/212,408, filed on Aug. 31, 2015.

(51) Int. Cl.
*F16L 23/18* (2006.01)
*F16L 23/028* (2006.01)
*F16L 21/08* (2006.01)

(52) U.S. Cl.
CPC ............ *F16L 23/18* (2013.01); *F16L 23/0286* (2013.01); *F16L 21/08* (2013.01)

(58) Field of Classification Search
CPC .............................. F16L 23/0286; F16L 23/18
USPC .................................. 285/339, 340, 342, 343
See application file for complete search history.

(56) References Cited

U.S. PATENT DOCUMENTS

| | | | | |
|---|---|---|---|---|
| 2,398,618 A | * | 4/1946 | Chavayda | F16L 19/12 285/116 |
| 2,466,526 A | * | 4/1949 | Wolfram | F16L 19/12 285/104 |
| 2,478,149 A | * | 8/1949 | Wolfram | F16L 19/08 285/342 |
| 2,840,395 A | * | 6/1958 | Tarnow | F16L 19/083 285/321 |
| 3,389,923 A | * | 6/1968 | Love, Jr. | F16L 37/088 285/321 |
| 3,498,647 A | * | 3/1970 | Schroder | F16L 19/086 174/750 |
| 4,073,514 A | * | 2/1978 | Pate | F16L 37/091 285/149.1 |
| 4,146,254 A | | 3/1979 | Turner et al. | |

(Continued)

FOREIGN PATENT DOCUMENTS

EP 0742017 A2 11/1996
EP 1108176 B1 12/2005

(Continued)

OTHER PUBLICATIONS

European Patent Office Extended Search Report for EP Patent Application No. 15 170 425.1, dated Sep. 23, 2015 (7 pages).

(Continued)

*Primary Examiner* — David Bochna
(74) *Attorney, Agent, or Firm* — Taft Stettinius & Hollister LLP

(57) ABSTRACT

A pipe connection fitting includes a gasket holder ring, a flap ring and a grip ring operably coupled together. A terminal housing is configured to engage with the gasket holder, flap ring and grip ring to form the pipe connection fitting adjacent an end of a pipe. The flap ring includes a plurality of tabs extending therefrom to provide an abutment for controlling a relative position of the grip ring.

22 Claims, 5 Drawing Sheets

(56) References Cited

U.S. PATENT DOCUMENTS

| | | | |
|---|---|---|---|
| 4,188,051 A * | 2/1980 | Burge | F16L 37/0925 |
| | | | 285/104 |
| 4,288,105 A | 9/1981 | Press | |
| 4,299,413 A | 11/1981 | Neher | |
| 4,407,526 A | 10/1983 | Cicenas | |
| 4,568,109 A | 2/1986 | Prueter | |
| 5,176,406 A | 1/1993 | Straghan | |
| 5,549,334 A | 8/1996 | Zeisler et al. | |
| 5,603,530 A | 2/1997 | Guest | |
| 5,803,513 A | 9/1998 | Richardson | |
| 5,842,726 A | 12/1998 | Halen, Jr. | |
| 6,378,915 B1 * | 4/2002 | Katz | F16L 19/086 |
| | | | 277/604 |
| 7,318,609 B2 * | 1/2008 | Naito | F16L 37/133 |
| | | | 285/307 |
| 7,726,700 B2 * | 6/2010 | Norman | F16L 19/083 |
| | | | 285/322 |
| 8,205,915 B1 | 6/2012 | Crompton et al. | |
| 8,474,877 B2 * | 7/2013 | Smith | F16L 5/06 |
| | | | 285/154.1 |
| 8,480,134 B2 | 7/2013 | Crompton et al. | |
| 2009/0273184 A1 | 11/2009 | Wright et al. | |
| 2011/0210543 A1 * | 9/2011 | German | F16L 21/007 |
| | | | 285/330 |
| 2014/0091569 A1 * | 4/2014 | Spohn | A61M 39/08 |
| | | | 285/285.1 |

FOREIGN PATENT DOCUMENTS

| | | |
|---|---|---|
| FR | 1201165 | 12/1959 |
| FR | 1574855 | 7/1969 |
| FR | 2692644 A1 | 12/1993 |
| GB | 2184186 A | 6/1987 |
| GB | 2300680 A | 11/1996 |
| WO | 9418486 A1 | 8/1994 |

OTHER PUBLICATIONS

European Patent Office Extended Search Report for EP Patent Application No. 16 186 268.5, dated Dec. 20, 2016 (9 pages).

* cited by examiner

PIPE CONNECTION FITTING

TECHNICAL FIELD

The present application generally relates to a pipe connection fitting and more particularly, but not exclusively, to a flap ring with pivotable tabs configured to control a position of a grip ring in the pipe connection fitting.

BACKGROUND

There are a many different types of fittings operable to join pipes together. In some aspects it can be desirable to disassemble a pipe connection fitting from a pipe and reassemble the pipe connection fitting on the same or a different pipe. It can be further desirable to provide a pipe connection fitting that can position components in a defined location such that a fluid tight connection with a pipe can be repeatedly made. Some existing systems have various shortcomings relative to certain applications. Accordingly, there remains a need for further contributions in this area of technology.

SUMMARY

One embodiment of the present application is a unique connection fitting for a pipe. Other embodiments include apparatuses, systems, devices, hardware, methods, and combinations for pipe connection systems having a unique connection fitting with a flap ring to control axial placement of one or more components within the fitting. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
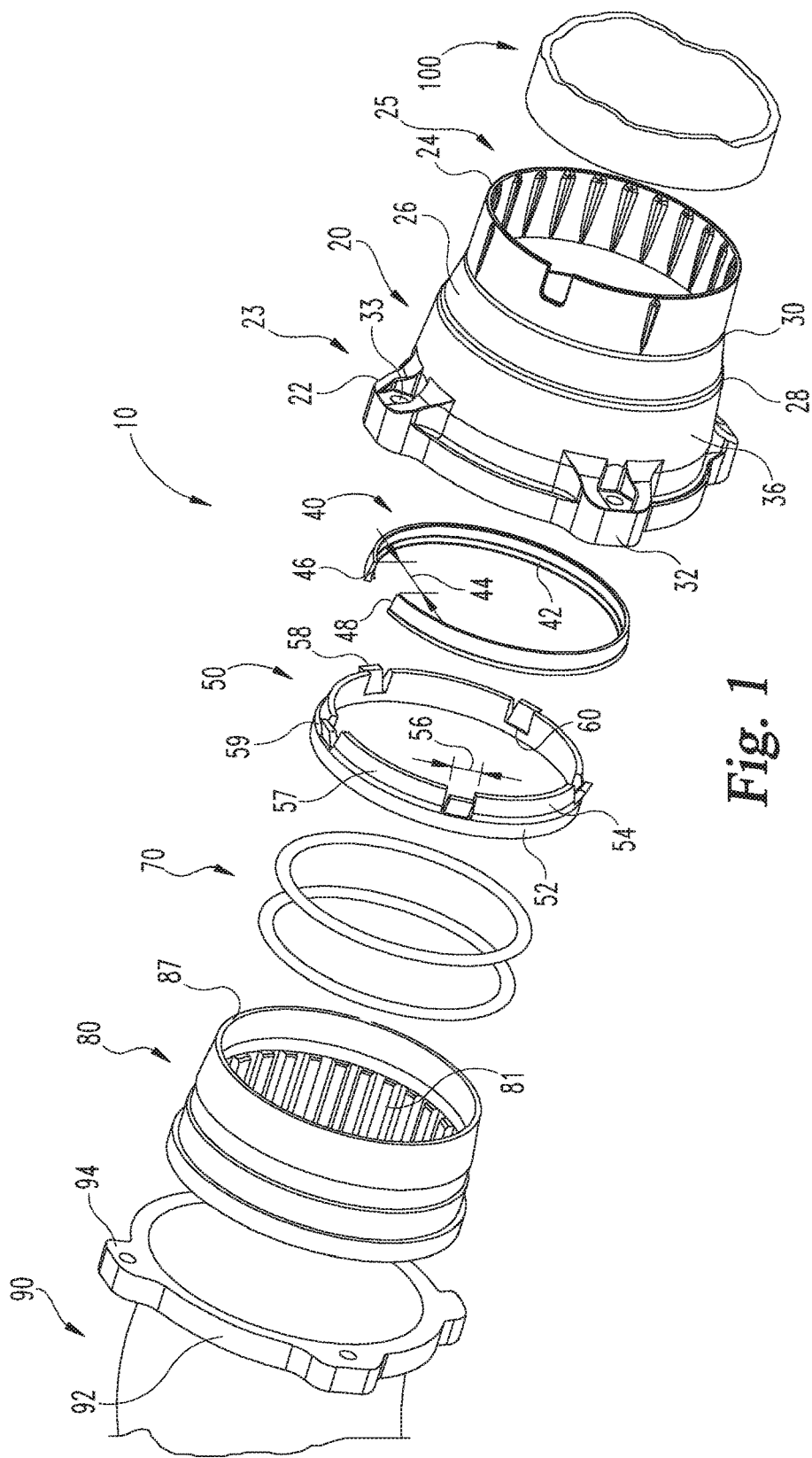
FIG. 1 is a perspective exploded view of a connection fitting according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
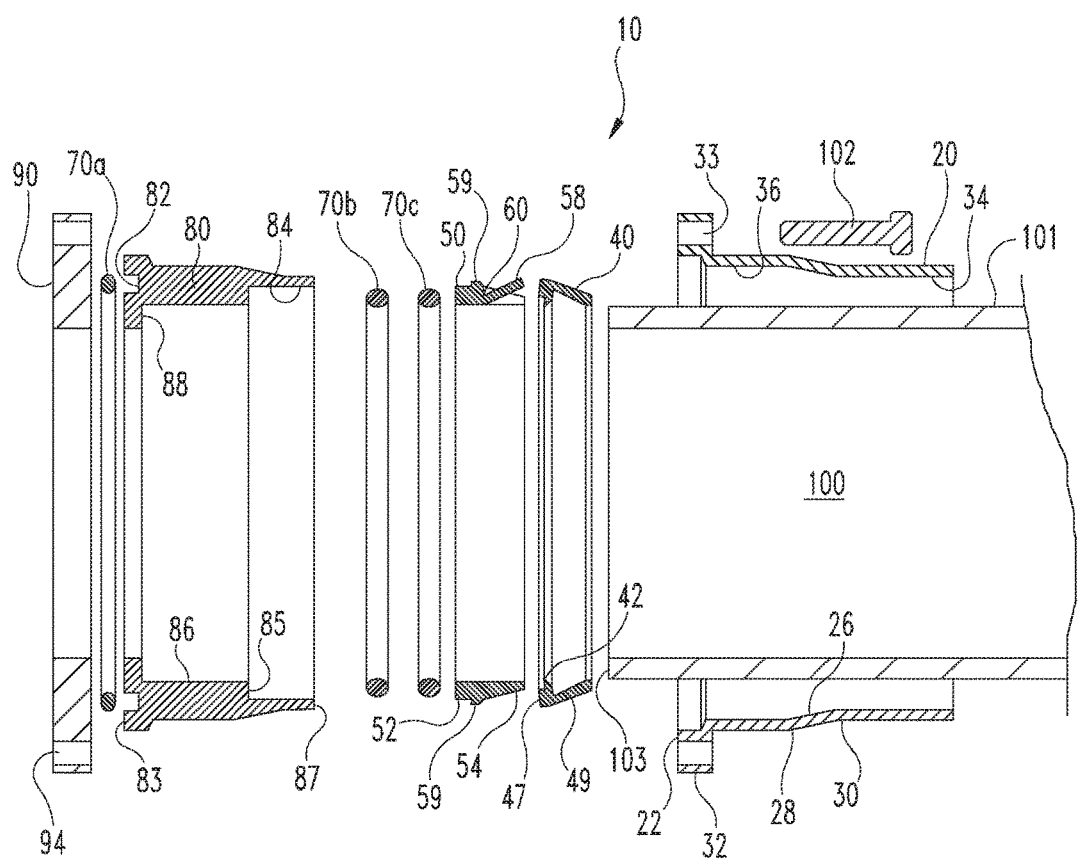
FIG. 2 is a cross sectional view of the connection fitting of FIG. 1.

Referring generally to FIGS. 1 and 2, a connection fitting 10 for a pipe 100 is shown therein in an exploded view. The connection fitting 10 includes a cylindrically shaped terminal 20 extending between a forward flange 22 at a first end 23 and an aft ring 24 at a second end 25. A sloped ramp portion 26 is positioned between the forward flange 22 and the aft ring 24. The sloped ramp portion 26 is defined between a first transition region 28 and a second transition region 30. In one embodiment the terminal 20 can include a cylindrical portion 36 extending from the forward flange 22 to the first transition region 28. The terminal 20 can also include a cylindrical portion 34 extending from the second transition region 30 toward the second end 25. One or more connecting ears 32 can be attached to the forward flange 22 and can extend in a radially outward direction. Each connecting ear 32 can include one or more through apertures 33 formed therein.

A grip ring 40 is configured to secure the fitting 10 to the pipe 100 with a tooth 42 oriented in a circumferential direction around the grip ring 40. The tooth 42 is constructed to engage with and penetrate into an outer surface the pipe 100 during installation to hold the pipe connection fitting 10 in a locked position relative to the pipe 100. The grip ring 40 is a split ring that includes a gap 44 such that first and second ends 46 and 48 of the grip ring 40 are spaced apart in a free state. The terminal 20 forces the ends 46, 48 of the grip ring 40 closer together during installation which causes the tooth 42 to penetrate into the outer surface of the pipe 100. The grip ring 40 will be described in further detail below.

A flap ring 50 is positioned adjacent the grip ring 40 in the assembled pipe connection fitting 10. The flap ring 50 includes a first ring portion 52 which can be substantially cylindrical in form. A second tapered ring portion 54 extends from the first ring portion 52. The second tapered ring portion 54 includes one or more open slots 56 formed therein to define separate segments 57 intermittently spaced around the tapered ring portion 54. A plurality of flaps or tabs 58 are positioned to coincide with corresponding slots 56. Each tab 58 includes a hinge portion 60 to permit the tab 58 to rotate or pivot thereabout so as to vary from a more radially outward projection to a more radially inward projection. A locating flange or shoulder 59 projecting radially outward can be positioned proximate an interface region between the first ring portion 52 and the tapered ring portion 54 of the flap ring 50.

The pipe connection fitting 10 can include one or more seals 70 (70a, 70b, 70c etc. . . . ) and in one form can be an O-ring seal or the like. A gasket holder ring 80 is configured to hold one or more of the seals 70 and a portion of the flap ring 40. The first cylindrical ring portion 52 of the flap ring 50 can be positioned within the gasket holder ring 80 such that the locating flange 59 is abutted with an end wall 87 of the gasket holder ring 80. The gasket holder ring 80 can further include a plurality of ribs 81 projecting inward from an inner surface thereof so as to provide engagement means with the pipe 100.

A pipe connector 90 for coupling with the terminal 20 can include a connecting flange 92 with ears 94 that corresponds to the connecting ears 32 of the terminal 20 so as to permit connection of the flanges 92, 22 together with one or more threaded fasteners 102 or the like. The threaded fasteners 102 can extend through the connecting ears 32 of the forward flange 22 of the terminal 20 and through the opposing connecting ears 94 of the pipe connector 90. The fasteners 102 can be tightened via a nut (not shown) or a threaded ear portion as would be known to one skilled in the art to form a locking engagement between the terminal 20 and the pipe connector 90.

The grip ring 40 includes a forward face 47 (best seen in FIG. 2) with a tapered wall 49 extending therefrom. The tapered wall 49 of the grip ring 40 extends from a radially outward position proximate the face 47 to a radially inward position distal from the face 47. The circumferential tooth 42 extends radially inward from the grip ring 40 and can be seen with greater cross-section detail in FIG. 4.

With particular reference to FIG. 2 and as described above, the terminal 20 includes a substantially cylindrical first portion 36 that transitions proximate the first transition region 28 to a sloped or ramp section 26 projecting radially inward until the ramp section 26 reaches the second transition region 30. The second cylindrical guide region 34 extends away from the second transition region 30 to form a guide for the pipe 100. It should be noted that in the view shown in FIG. 2, the guide region 34 is shown radially outward of the outer diameter 101 of the pipe 100 for clarity, however in some forms the inner diameter of the cylindrical portion 34 can be approximately line to line with the outer diameter 101 of the pipe 100 to keep the terminal 20 concentrically aligned with the pipe 100. In other forms the inner diameter of the cylindrical portion 34 can be greater than a line to line fit with the pipe 100.

The gasket holder ring 80 includes a landing region 84 to hold one or more seals 70 and at least a portion of the flap ring 50 therein. The landing region 84 can include the landing region abutment 85 to position the one or more seals 70b, 70c in a desired location relative to the gasket holder ring 80. A portion of the flap ring 50 including the first cylindrical ring portion 52 can be positioned within the landing region 84. The locating flange 59 of the flap ring 50 can engage with the end wall 87 of the gasket holder ring 80 to control axial location of the flap ring 50 relative to the gasket holder ring 80. A seal groove 82 can be formed in a face 83 of the gasket holder ring 80 such that an additional seal such as an O-ring seal 70a can be positioned in the groove 82 to form a fluid-tight seal between the gasket holder ring 80 and the pipe connector 90. A pipe guide portion 86 can be formed on an inner portion of the gasket holder ring 80 such that the outer diameter 101 of the pipe 100 can be substantially in line with the pipe guide 86 in certain embodiments. In other embodiments, the outer diameter 101 can be substantially smaller than the diameter of the guide portion 86. A pipe abutment 88 can be formed on the gasket holder ring 80 such that a terminal end 103 of the pipe 100 can engage therewith during installation to define a fixed position of the pipe relative to the gasket holder ring 80.

Figure 3:
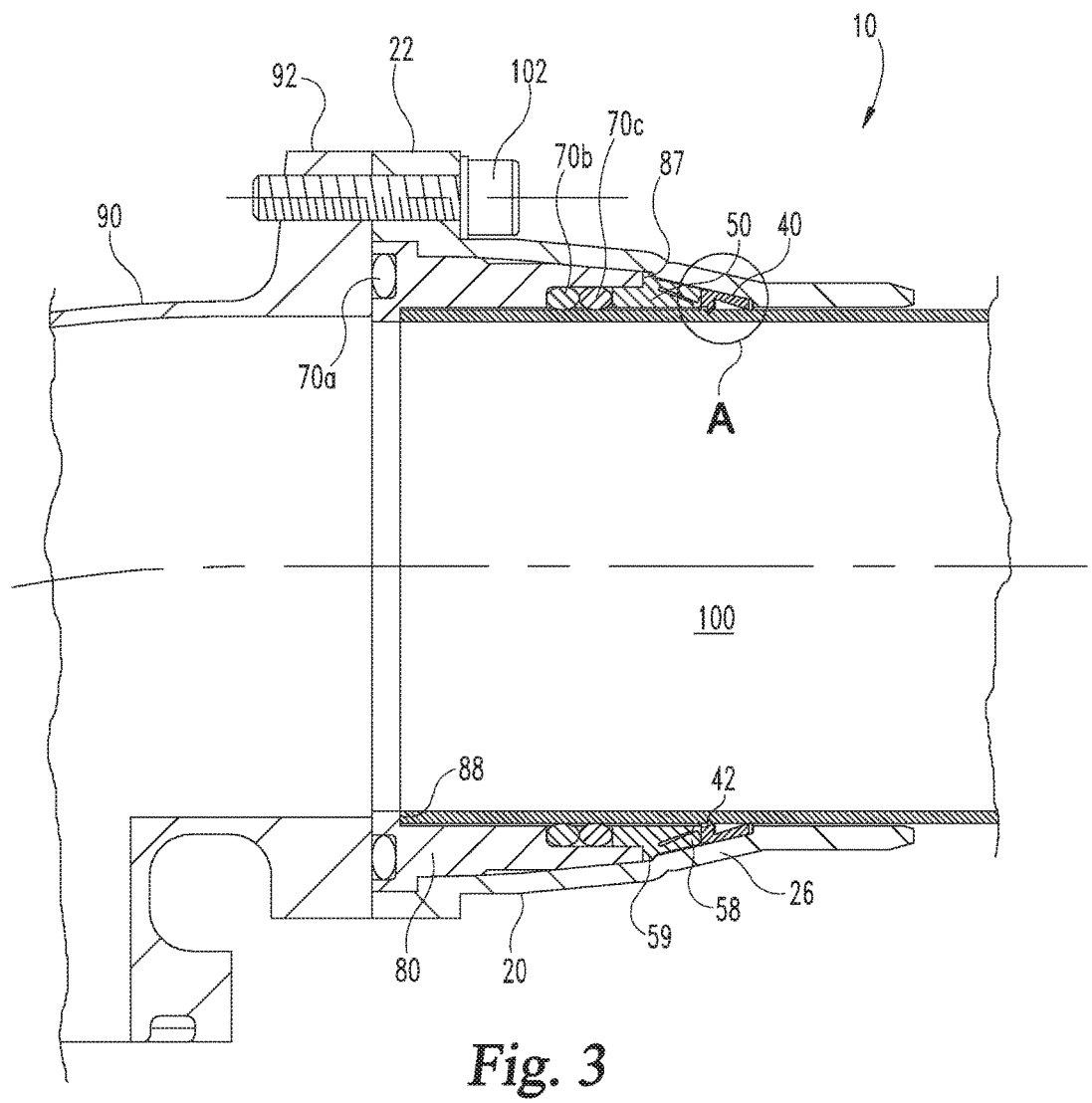
FIG. 3 is a cross sectional view of a portion of the connection fitting of FIG. 2 in an assembled condition.

Referring now to FIG. 3, the pipe connection fitting 10 is shown in cross-section in an assembled view. A circular portion labeled "A" is enlarged and shown in greater detail in FIG. 4. It can be further understood that as the terminal 20 is urged toward the pipe connector 90, the sloped ramp portion 26 will engage with the tabs 58 of the flap ring 50 and the grip ring 40 to move and lockingly hold each in a defined position in final installed orientation. This will be described in greater detail below.

Figure 4:
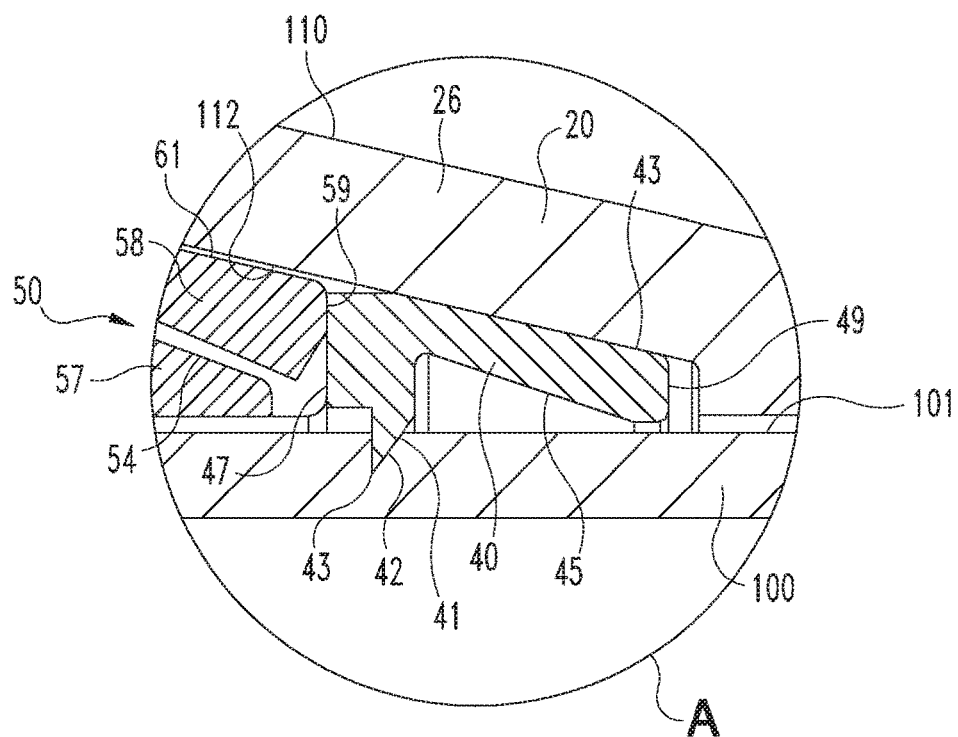
FIG. 4 is an enlarged view of a portion of FIG. 3.

Referring now to FIG. 4, an enlarged view of a portion of the terminal 20, the grip ring 40 and the flap ring 50 and the pipe 100 is depicted therein. The grip ring 40 includes a circumferential tooth 42 that has a substantially pointed edge 43. This exemplary embodiment illustrates a pointed edge with one angular side wall 41. However, it should be understood that other configurations of edge construction are also contemplated herein. The grip ring 40 further includes an inner wall 45 extending between the tooth 42 and an aft end 49 of the grip ring 40. The inner wall 45 can be formed in a substantially linear fashion as shown or can have other configurations if desired. In this example some portions of the inner wall 45 are positioned away from the outer diameter 101 of the pipe 100 and can extend to a portion of the inner wall 45 proximate to the aft end 49. The inner wall 45 at the aft end 49 can be substantially line to line or nominally engaged with the outer diameter 101 of the pipe 100. Other configurations of the grip ring 40 are also contemplated herein. A sloped outer wall 43 of the grip ring 40 extends between a forward face 47 of the grip ring 40 and the aft end 49. In one form the sloped outer wall 43 can include cylindrical portions and/or variable slope angles. In some forms, portions of the slope angle can correspond with the slope angle of an inner wall 112 of the ramp portion 26 of the terminal 20. In other regions the slope may not correspond with the slope angle of portions of the ramp portion 26.

In some forms the terminal 20 can include an outer wall portion 110 and a sloped inner wall portion 112 to define the sloped ramp portion 26. The inner sloped wall portion 112 is configured to engage with at least a portion of the sloped outer wall 43 of the grip ring 40 at a final installed position.

The tab 58 of the flap ring 50 includes an outer sloped wall 61 that can substantially align with a portion of the sloped inner wall 112 of the ramp portion 26 of the terminal 20 in the installed position. When the terminal 20 is engaged over the grip ring 40 and the flap ring 50, the inner sloped wall portion 112 causes the flap 58 to rotate about the hinge portion 60 (FIG. 1) in a radially inward direction such that in the final installed position the sloped outer wall 61 of the tab 58 can be aligned with the portion of the sloped inner wall 112 of the flap ring 50. The segments 57 of the tapered ring portion 54 and the hinged tabs 58 cooperate to move the grip ring 40 into a desired axial location as the terminal 20 slides over both the grip ring 40 and the flap ring 50 while being connected to the pipe connector 90. A face 59 of the tab 58 is positioned adjacent to the forward face 47 of the grip ring 40 in the final installed position. During assembly, sliding movement of the sloped inner wall 112 of the terminal 20 causes the tabs 58 to engage with and move the grip ring 50 as the tabs are forced to rotate downward into a final installed position. The position of the grip ring 40 is controlled via engagement of the forward face 47 with the tab face 59 of the tab 58 on one side and engagement with the sloped inner wall 112 on the other side. In a final installed position, the grip ring 40 may overlap or otherwise engage with the tapered ring portion 54 of the flap ring 50. In other forms the grip ring may be displaced away from the tapered ring portion 57 at the final installed position. The final installed position of the grip ring 40 can at least partially define the depth of the penetration of the tooth 42 of the grip ring 40 into the pipe 100 because the axial location thereof defines the engagement location with the sloped inner wall 112 of the terminal 20 which defines the resulting radial displacement of the tooth 42.

Figure 5:
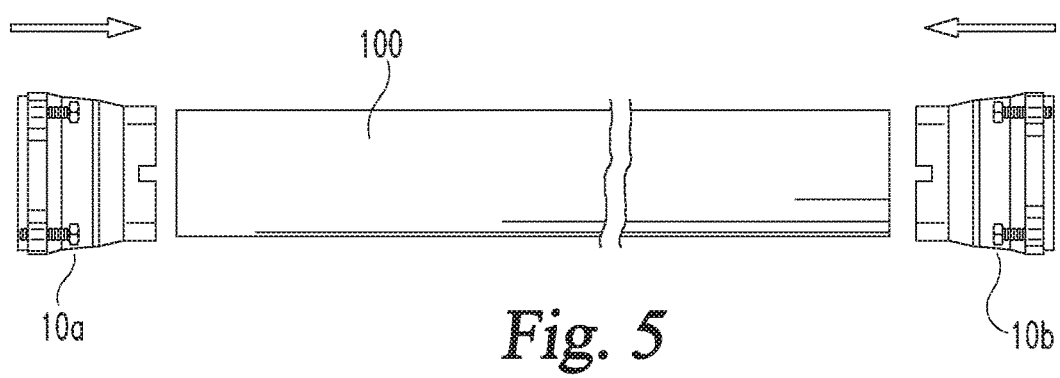
FIG. 5 is a side view of a pipe with connection fittings displaced from each end.
Figure 6:
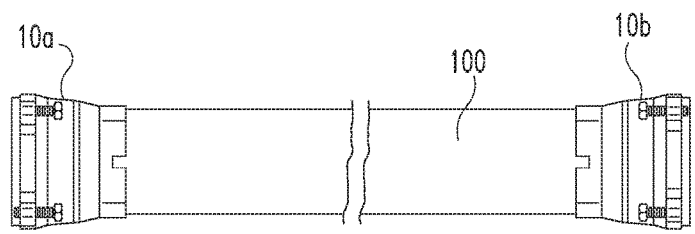
FIG. 6 is a side view of FIG. 5 with connection fittings attached at each end of the pipe.
Figure 7:
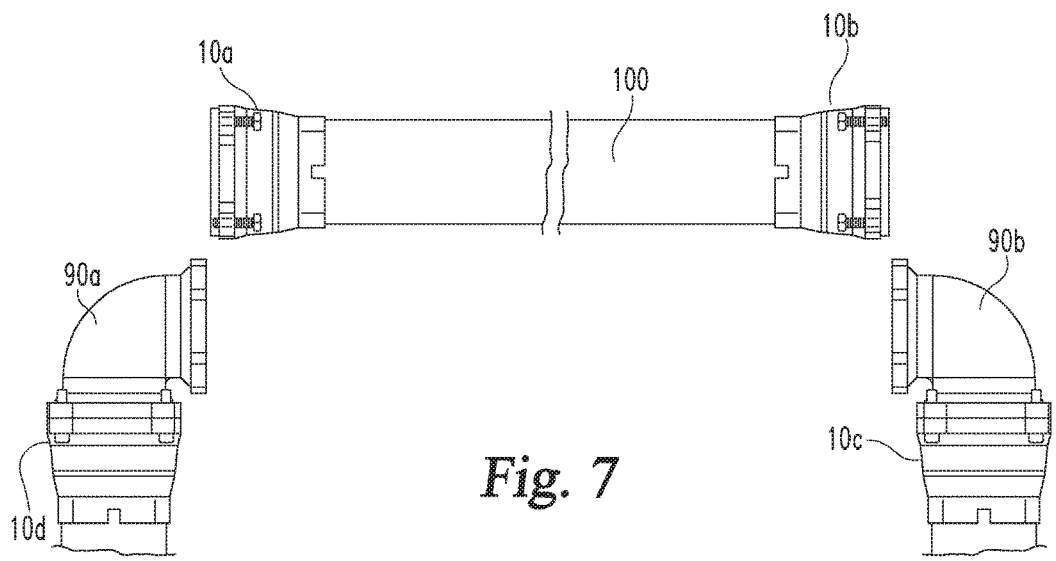
FIG. 7 is a view of FIG. 6 with multiple connection fittings and elbow couplings displaced from each side of the pipe.

FIGS. 5 through 7 illustrate various configurations for which a pipe connection fitting 10 can be used. FIG. 5 illustrates pipe connection fittings 10a and 10b that are displaced from either end of the pipe 100. FIG. 6 illustrates the pipe connection fittings installed on opposing ends of the pipe 100. FIG. 7 illustrates a configuration wherein elbow pipe connectors 90a, 90b can be connected between pipe fitting connectors 10a, 10b, 10c and 10d.

During installation of the pipe connection fitting 10, a pipe 100 can be inserted through a terminal 20, a grip ring 40, a flap ring 50, and the gasket holder ring 80. One or more seals 70 can be are positioned within the gasket holder ring 80 abutment 85 and the flap ring 50 can be located relative to the gasket holder ring 80 via abutment of the shoulder or locating flange 59 of the flap ring 50 with the end wall 87 of the gasket holder ring 80. In one form the grip ring 40 can be aligned relative the flap ring 40 such that the gap 44 of the grip ring is circumferentially positioned between adjacent slots 56 of the flap ring 50. As the terminal 20 slides over the grip ring 40, the grip ring 40 is initially expanded such that the gap 44 of the grip ring 40 is in the most expanded position and may permit the grip ring to slide axially over a portion of the pipe 100 and over segments 57 of the second tapered ring portion 54. As the sloped inner wall surface 112 of the terminal 20 slides over the tabs 58, the tabs 58 are forced to pivot or rotate about the hinged portion 60 into a radially downward direction. This downward rotation of the tabs 58 causes the tabs 58 to engage with and force the grip ring 40 back down the sloped segments 57 of the flap ring 50 if the grip ring 40 was initially in such a location.

The grip ring 40 is held in a final installed axial position on one side when the tab face 59 is engaged with the forward face 47 of the grip ring 40 and on the other side by the sloped ramp portion 26 of the terminal 20. As the terminal continues to slide towards the flange 92, the sloped surface 112 of the inner wall portion of the ramp 26 forces the pointed edge of the tooth 42 to penetrate into the surface of the pipe 100. The engaged tooth 42 restricts the entire pipe connection fitting 10 from moving relative to the pipe 100. The disclosed pipe connection fitting 10 is operable to control the axial location of the grip ring 40 and thereby the depth of engagement of the tooth 42 with the pipe 100. In this manner the pipe connection fitting 10 can be installed, disassembled and reinstalled on a pipe 100 without variation of the grip ring 40 relative to the flap ring 50 or variation in the depth of penetration of the tooth 42 into the surface of the pipe 100. Position control of the grip ring is desirable because too great of a penetration depth into the wall of the pipe 100 can weaken the pipe wall and result in failure of the pipe 100. On the other hand, if the penetration depth of the tooth 42 is too shallow then the grip ring 40 may not hold the connection fitting 100 in position relative to the pipe under certain loading conditions. The pipe connection fitting 10 of the present application ensures that a desired tooth penetration can be repeated each time a pipe 100 is connected with the fitting 10.

Material selection for the pipe connection fitting components, coupling members and other components can include various forms of metals, metal alloys, composites, ceramics, or plastics as desired. Metal materials can include, but are not limited to aluminum, steel, iron, super alloys and combinations thereof. The metal material may further be formed from cast, wrought, or sheet stock.

In one aspect the present disclosure includes pipe connection fitting comprising: a gasket holder ring; a seal positionable within the gasket holder ring; a flap ring having a first ring portion with a plurality of pivotable tabs extending therefrom; a grip ring positionable adjacent the flap ring; and a terminal housing configured to slidingly engage with the gasket holder ring.

Refining aspects include the flap ring having a second ring portion having a tapered wall extending radially inward from the first ring portion; a locating flange protruding radially outward between the first and second ring portions; and a plurality of slots formed intermittently around the second ring portion; wherein each of the plurality of tabs is positioned proximate a corresponding slot in the second ring portion; wherein each of the plurality of tabs includes a hinge portion extending from the first portion of the flap ring; wherein each of the hinge portions permits pivoting movement of each tab when engaged by the terminal housing during installation; wherein the tabs of the flap ring define an axial abutment for the grip ring; wherein the grip ring is a split ring that terminates at a pair of opposing ends spaced apart from one another in a free state; wherein the grip ring includes a tooth extending radially inward; wherein the tooth extends circumferentially along substantially an entire inner diameter of the grip ring; wherein the tooth is configured to engage with a surface of a pipe when the terminal is moved to an assembled position; wherein the terminal includes a sloped ramp portion engageable with the tabs of the of the flap ring and the grip ring; and wherein the tabs are pivoted about the hinge when slidingly engaged with the sloped ramp portion during installation of the terminal.

Another aspect of the present disclosure includes An apparatus comprising: a flap ring configured to control an axial location of a component of a pipe connection fitting; wherein the flap ring comprises: a first ring portion having a substantially cylindrical outer wall diameter; a second ring portion having a tapered outer wall with a decreasing outer diameter projecting from the first ring portion; a plurality of slots formed intermittently around the second ring portion; and a plurality of tabs extending from a hinge connected to the first ring portion, wherein each tab is positioned to correspond with one of the slots in the second ring portion.

Refining aspects include wherein the hinge permits pivoting movement of the tabs; wherein the tabs project angularly outward from the hinge in a free state; a gasket holder ring constructed to receive the flap ring; and a grip ring positioned adjacent the flap ring; wherein the grip ring is a split ring with a gap between terminal ends; a seal positionable within the gasket holder ring; a terminal having a tapered inner wall; wherein the tapered inner wall of the terminal is constructed to engage with the tabs of the flap ring such that the tabs are pivoted radially inward during sliding movement of the terminal; and wherein the tabs are engageable with the grip ring to control a relative axial position thereof; wherein the grip ring includes a tooth projecting radially inward; wherein the tapered inner wall of the terminal is constructed to engage with the grip ring to control a penetration depth of the tooth into a wall of a pipe.

Another aspect of the present disclosure includes a method comprising: installing a gasket holder ring on a pipe; positioning a flap ring at least partially within the gasket holder ring, the flap ring including: a first ring portion having a substantially cylindrical wall, a second ring portion having a tapered wall with a decreasing outer diameter projecting from the first portion, a plurality of slots formed intermittently around the second ring portion; a plurality of tabs pivotally connected to the first ring portion and positioned to align with the slots in the second ring portion, and a locator flange positioned between the first and second ring portions constructed to engage with an end wall of the gasket holder ring; positioning a grip ring with a circumferential tooth adjacent the flap ring; sliding a terminal housing over the gasket holder ring; pivoting the plurality of tabs during the sliding of the terminal; and lockingly engaging the tooth of the grip ring with a wall of the pipe as the terminal slides to an installed position.

Refining aspects include comprising moving the grip ring relative to the tapered wall of the flap ring with the pivoting tabs; wherein the tabs of the flap ring form an abutment to control an axial position between the flap ring and the grip ring; wherein the grip ring is a split ring with a gap between terminal ends; and circumferentially aligning the gap of the split ring between adjacent tabs of the flap ring.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A pipe connection fitting comprising:
a gasket holder ring;
a seal positionable within the gasket holder ring;
a flap ring having a first ring portion with a plurality of pivotable tabs extending therefrom;
a hinge portion extending from the first ring portion of the flap ring to each of the plurality of tabs;
a grip ring positionable adjacent the flap ring; and
a terminal housing configured to slidingly engage with the gasket holder ring.

2. The pipe connection fitting of claim 1, wherein the flap ring includes:
a second ring portion having a tapered wall extending radially inward from the first ring portion;
a locating flange protruding radially outward between the first and second ring portions; and
a plurality of slots formed intermittently around the second ring portion.

3. The pipe connection fitting of claim 2, wherein each of the plurality of tabs is positioned proximate a corresponding slot in the second ring portion.

4. The pipe connection fitting of claim 1, wherein each of the hinge portions permits pivoting movement of each tab when engaged by the terminal housing during installation.

5. The pipe connection fitting of claim 1, wherein the tabs of the flap ring define an axial abutment for the grip ring.

6. The pipe connection fitting of claim 1, wherein the grip ring is a split ring that terminates at a pair of opposing ends spaced apart from one another in a free state.

7. The pipe connection fitting of claim 1, wherein the grip ring includes a tooth extending radially inward.

8. The pipe connection fitting of claim 7, wherein the tooth extends circumferentially along substantially an entire inner diameter of the grip ring.

9. The pipe connection fitting of claim 7, wherein the tooth is configured to engage with a surface of a pipe when the terminal housing is moved to an assembled position.

10. The pipe connection fitting of claim 1, wherein the terminal housing includes a sloped ramp portion engageable with the tabs of the of the flap ring and with the grip ring; and
wherein the tabs are pivoted about the hinge when slidingly engaged with the sloped ramp portion during installation of the terminal.

11. An apparatus comprising:
a flap ring configured to control an axial location of a component of a pipe connection fitting;
wherein the flap ring comprises:
a first ring portion having a substantially cylindrical outer wall diameter;
a second ring portion having a tapered outer wall with a decreasing outer diameter projecting from the first ring portion to a distal end thereof;
a plurality of slots formed intermittently around the second ring portion;
a hinge connected to the first ring portion; and
a plurality of tabs extending from the hinge to the distal end of the second ring, wherein each tab is positioned to correspond with one of the slots in the second ring portion;
wherein the tabs project angularly outward from the hinge in a free state.

12. The apparatus of claim 11, wherein the hinge permits pivoting movement of the tabs.

13. The apparatus of claim 11 further comprising:
a gasket holder ring constructed to receive the flap ring; and
a grip ring positioned adjacent the flap ring.

14. The apparatus of claim 13, wherein the grip ring is a split ring with a gap between terminal ends.

15. The apparatus of claim 13 further comprising a seal positionable within the gasket holder ring.

16. The apparatus of claim 13 further comprising:
a terminal having a tapered inner wall;
wherein the tapered inner wall of the terminal is constructed to engage with the tabs of the flap ring such that the tabs are pivoted radially inward during sliding movement of the terminal; and
wherein the tabs are engageable with the grip ring to control a relative axial position thereof.

17. The apparatus of claim 16, wherein the grip ring includes a tooth projecting radially inward.

18. The apparatus of claim 17, wherein the tapered inner wall of the terminal is constructed to engage with the grip ring to control a penetration depth of the tooth into a wall of a pipe.

19. A method comprising:
installing a gasket holder ring on a pipe;
positioning a flap ring at least partially within the gasket holder ring, the flap ring including:
a first ring portion having a substantially cylindrical wall, a second ring portion having a tapered wall with a decreasing outer diameter projecting from the first portion, a plurality of slots formed intermittently around the second ring portion; a plurality of tabs pivotally connected to the first ring portion and positioned to align with the slots in the second ring portion, and a locator flange positioned between the first and second ring portions constructed to engage with an end wall of the gasket holder ring;

positioning a grip ring with a circumferential tooth adjacent the flap ring;

sliding a terminal housing over the gasket holder ring;

pivoting the plurality of tabs during the sliding of the terminal; and lockingly engaging the tooth of the grip ring with a wall of the pipe as the terminal slides to an installed position.

20. The method of claim 19, further comprising moving the grip ring relative to the tapered wall of the flap ring with the pivoting tabs.

21. The method of claim 20, wherein the tabs of the flap ring form an abutment to control an axial position between the flap ring and the grip ring.

22. The method of claim 19, wherein the grip ring is a split ring with a gap between terminal ends; and circumferentially aligning the gap of the split ring between adjacent tabs of the flap ring.

* * * * *